(12) United States Patent
Shimizu et al.

(10) Patent No.: US 10,232,543 B2
(45) Date of Patent: Mar. 19, 2019

(54) THICKNESS VARIATION-ADJUSTING AIR RING

(71) Applicant: SHONAN TRADING CO., LTD., Yokohama-shi (JP)

(72) Inventors: Akira Shimizu, Sagamihara (JP); Norio Hashimoto, Yokohama (JP)

(73) Assignee: SHONAN TRADING CO., LTD., Yokohama-Shi, Kanagawa (JP)

( * ) Notice: Subject to any disclaimer, the term of this patent is extended or adjusted under 35 U.S.C. 154(b) by 196 days.

(21) Appl. No.: 15/301,244

(22) PCT Filed: Mar. 18, 2015

(86) PCT No.: PCT/JP2015/057986
§ 371 (c)(1),
(2) Date: Sep. 30, 2016

(87) PCT Pub. No.: WO2015/159634
PCT Pub. Date: Oct. 22, 2015

(65) Prior Publication Data
US 2017/0015043 A1    Jan. 19, 2017

(30) Foreign Application Priority Data
Apr. 14, 2014 (JP) .................................. 2014-083122

(51) Int. Cl.
*B29C 47/20* (2006.01)
*B29C 47/88* (2006.01)
(Continued)

(52) U.S. Cl.
CPC ...... *B29C 47/8835* (2013.01); *B29C 47/0026* (2013.01); *B29C 47/20* (2013.01);
(Continued)

(58) Field of Classification Search
CPC . B60C 47/0026; B60C 55/28; B29C 47/0026; B29C 47/8835; B29C 47/20;
(Continued)

(56) References Cited

U.S. PATENT DOCUMENTS 4,425,290 A    1/1984 Upmeier
4,443,400 A *  4/1984 Herrington ......... B29C 47/8835
                                                 264/519
(Continued)

FOREIGN PATENT DOCUMENTS

DE    3743720 A1 *  9/1989 ......... B29C 47/0026
DE    3743720 A1    9/1989
(Continued)

OTHER PUBLICATIONS

International Search Report (ISR) (PCT Form PCT/ISA/210), in PCT/JP2015/057986, dated Apr. 21, 2015.
(Continued)

*Primary Examiner* — Jacob T Minskey
*Assistant Examiner* — Cedrick S Williams
(74) *Attorney, Agent, or Firm* — McGinn I.P. Law Group, PLLC.

(57) ABSTRACT

Provided is a thickness variation adjustment-type air ring capable of accurately and optimally controlling the volume of cooling air at all positions in the circumferential direction, and stably manufacturing a synthetic resin film having an exceptionally low thickness variation. A thickness variation adjustment-type air ring is provided on a die of an inflation film manufacturing apparatus which locally controls the volume of cooling air discharged from a cooling air passage in a circumferential direction to adjust the thickness variation of a synthetic resin film when blowing the cooling air around a molten synthetic resin tube extruded in a longitudinal direction to cool and solidify the molten synthetic resin (Continued)

tube to form the synthetic resin film, the thickness variation adjustment-type air ring. The thickness variation adjustment-type air ring includes: a ring-shaped passage adjustment portion arranged sequentially in the circumferential direction inside of the cooling air passage; and a plurality of moving portions connected at a predetermined position in the circumferential direction of the passage adjustment portion so as to move a connecting portion of the passage adjustment portion in a predetermined direction independently from other portions, wherein a space in which cooling air can circulate inside the cooling air passage is locally adjusted in the circumferential direction and the volume of cooling air is locally controlled in the circumferential direction.

8 Claims, 11 Drawing Sheets

(51) Int. Cl.

| | | |
|---|---|---|
| *B29C 47/92* | (2006.01) | |
| *B29C 55/28* | (2006.01) | |
| *B29C 47/00* | (2006.01) | |
| *B29K 105/00* | (2006.01) | |
| *B29L 23/00* | (2006.01) | |

(52) U.S. Cl.
CPC ............. *B29C 47/88* (2013.01); *B29C 47/92* (2013.01); *B29C 55/28* (2013.01); *B29C 2947/926* (2013.01); *B29C 2947/92971* (2013.01); *B29K 2105/0067* (2013.01); *B29L 2023/001* (2013.01)

(58) Field of Classification Search
CPC ... B29C 47/88; B29C 47/92; B29C 2947/926; B29C 2947/92971; B29C 55/28
See application file for complete search history.

(56) References Cited

U.S. PATENT DOCUMENTS

| | | | |
|---|---|---|---|
| 5,281,375 A * | 1/1994 | Konermann | B29C 47/0026 264/40.3 |
| 5,562,926 A * | 10/1996 | Karl | B29C 47/0026 425/141 |
| 5,676,893 A | 10/1997 | Cree | |
| 2002/0130431 A1 | 9/2002 | Randolph et al. | |
| 2016/0250792 A1 * | 9/2016 | Caccia | B29C 47/0026 264/177.1 |

FOREIGN PATENT DOCUMENTS

| | | |
|---|---|---|
| DE | 42 18 997 C1 | 1/1994 |
| EP | 1 004 424 A1 | 5/2000 |
| GB | 854368 A | 11/1960 |
| JP | S54-64173 U | 5/1979 |
| JP | S 56-164824 A | 12/1981 |
| JP | S 58-28823 Y2 | 6/1983 |
| JP | S 59-015518 U | 1/1984 |
| JP | H 05-269844 A | 10/1993 |
| JP | H 07-205279 A | 8/1995 |
| JP | 2004-276505 A | 10/2004 |
| JP | 2009-269382 A | 11/2009 |

OTHER PUBLICATIONS

Octagon Process Technology GmbH, "Automatically Controlled air ring SmartLip DL," [Online], Retrieved on Apr. 11, 2014, Internet: http://octagon-gmbh.de/uploads/PDF/prospektdownloads/englisch/SmartLip-DL_e.pdf#search='smartlipdl_e+V1.1.odt%2F05.12'.
Extended European Search Report dated Sep. 19, 2017 in European Application No. 15779799.4.
Chinese Office Action dated Feb. 23, 2018 in Chinese Application No. 201580018984.9 with an English translation thereof.
Chinese Office Action, dated Sep. 20, 2018 in Chinese Application No. 201580018984.9 and English Translation thereof.

* cited by examiner 51    53

THICKNESS VARIATION-ADJUSTING AIR RING

TECHNICAL FIELD

The present invention relates to a thickness variation adjustment-type air ring which is provided on a die of an inflation film manufacturing apparatus that forms a synthetic resin film so as to locally control the volume of cooling air in a circumferential direction in order to adjust the thickness variation (thickness unevenness) of a synthetic resin film when blowing the said cooling air around an extruded molten synthetic resin tube to cool and solidify the molten synthetic resin tube to form the synthetic resin film.

BACKGROUND ART

A general inflation film manufacturing apparatus forms a synthetic resin film by cooling and solidifying a molten synthetic resin tube extruded from a die slit (for example, see Patent Document 1). The inflation film manufacturing apparatus of Patent Document 1 includes a die head having a ring nozzle, an outer blowing nozzle and a measurement device for measuring the film thickness of tube-shaped film. The volume of air flow passing through the nozzles of the ring of the air nozzle group is controlled based on the measurement results of the measurement device.

Moreover, an inflation film manufacturing apparatus which controls the thickness variation of a synthetic resin film by creating a difference in the volume of cooling air locally in the circumferential direction is proposed (for example, see Non-Patent Document 1). An air ring illustrated in FIGS. 9 to 11, for example, is known as an example of an air ring used in this type of inflation film manufacturing apparatus. As illustrated in FIG. 9, a number of block-shaped slope members are arranged in a ring form in a cooling air passage inside of an air ring 100. The slope members 101 are moved in a radial direction by a moving portion 107 such as a motor, to locally change the gap of passages 103 formed between the slope members 101 and a blow out ring 102. In this way, it is possible to locally control the volume of cooling air directed to a molten synthetic resin tube 104 in a circumferential direction. In FIGS. 9 and 10, reference numeral 105 indicates a hose opening, through which cooling air 106 from a blower (not illustrated) is introduced via a hose (not illustrated) connected to the hose opening 105. In the illustrated example, the hose opening 105 has four hose openings separated at a predetermined interval in the circumferential direction.

CITATION LIST

Patent Document

Patent Document 1: Japanese Unexamined Patent Application, Publication No. H5-269844

Non-Patent Document 1: Octagon Process Technology GmbH, "Automatically Controlled air ring SmartLip DL," [Online], Retrieved on Apr. 11, 2014, Internet <http://octagon-gmbh.de/uploads/PDF/prospektdownloads/englisch/SmartLip-DL_e.pdf#search='smartlipdl_e+V1.1.odt%2F05.12'>

DISCLOSURE OF THE INVENTION

Problems to be Solved by the Invention

However, in the air ring 100 having the above-described configuration, it is necessary to form a gap 108 between each adjacent slope member 101 in order to move any slope member 101 in the radial direction. If the grip portion 108 is not present, the respective slope members 101 may block each other's way and may not move toward the inner side of the radial direction from their positions. Moreover, even if it is set so that there be no gap 108 between each slope member 101 on the inner side of the radial direction, although the slope members 101 will still be able to move toward the outer side in the radial direction, the gap 108 will be formed when the slope members move toward the outer side of the radial direction.

In a structure which has the gap 108 as described above, the flow of cooling air is disturbed as indicated by flow lines 109 in FIG. 9. Moreover, although the cooling airflowing through portions other than the gap 108 is controlled by each of the slope members 101, the cooling air, flowing through the gap 108, flows regardless of the gap of the passage 103 formed by the slope members 101, and for this reason it is not possible to control the cooling air flowing through the gap 108. Since the thickness variation of a synthetic resin film depends on the flow conditions such as the volume of cooling air, the problem of having parts of the synthetic resin film whose thickness variation is not possible to control, occurs.

With the foregoing in view, the objective of the present invention is to provide a thickness variation adjustment-type air ring capable of accurately and optimally controlling the volume of cooling air at all positions in the circumferential direction and stably manufacturing a synthetic resin film having an exceptionally low thickness variation.

Means for Solving the Problems

In order to attain the aforementioned objective, the present invention provides a thickness variation adjustment-type air ring which is provided on a die of an inflation film manufacturing apparatus and which locally controls the volume of cooling air discharged from a cooling air passage in a circumferential direction to adjust the thickness variation of a synthetic resin film when blowing the said cooling air around a molten synthetic resin tube extruded in a longitudinal direction to cool and solidify the molten synthetic resin tube to form the synthetic resin film, the thickness variation adjustment-type air ring comprising: a ring-shaped passage adjustment portion arranged sequentially inside the cooling air passage in the circumferential direction; and a plurality of moving portions connected at a predetermined position in the circumferential direction of the passage adjustment portion so as to move a connecting portion of the passage adjustment portion in a predetermined direction independently from other portions, wherein a space in which the cooling air can circulate inside the cooling air passage is locally adjusted in the circumferential direction and the volume of cooling air is locally controlled in the circumferential direction.

In the thickness variation adjustment-type air ring, the passage adjustment portion may be formed of a ring-shaped elastic member formed sequentially in the circumferential direction.

In the thickness variation adjustment-type air ring, the moving portion may move a connecting portion of the elastic member in the longitudinal direction of the molten synthetic resin tube.

In the thickness variation adjustment-type air ring, the moving portion may move a connecting portion of the elastic member in the radial direction of the molten synthetic resin tube.

In the thickness variation adjustment-type air ring, the passage adjustment portion may be formed of a plurality of movable members which are arranged in a ring form without any gap in the circumferential direction and can move in the longitudinal direction of the molten synthetic resin tube.

In the thickness variation adjustment-type air ring, the moving portion may move the movable member in the longitudinal direction of the molten synthetic resin tube.

Advantages of the Invention

According to the present invention, it is possible to accurately and optimally control the volume of cooling air at all positions in the circumferential direction and stably manufacture a synthetic resin film having an exceptionally low thickness variation.

PREFERRED MODE FOR CARRYING OUT THE INVENTION

Hereinafter, a plurality of embodiments of a thickness variation adjustment-type air ring according to the present invention will be described in detail with reference to the drawings.

Figure 1:
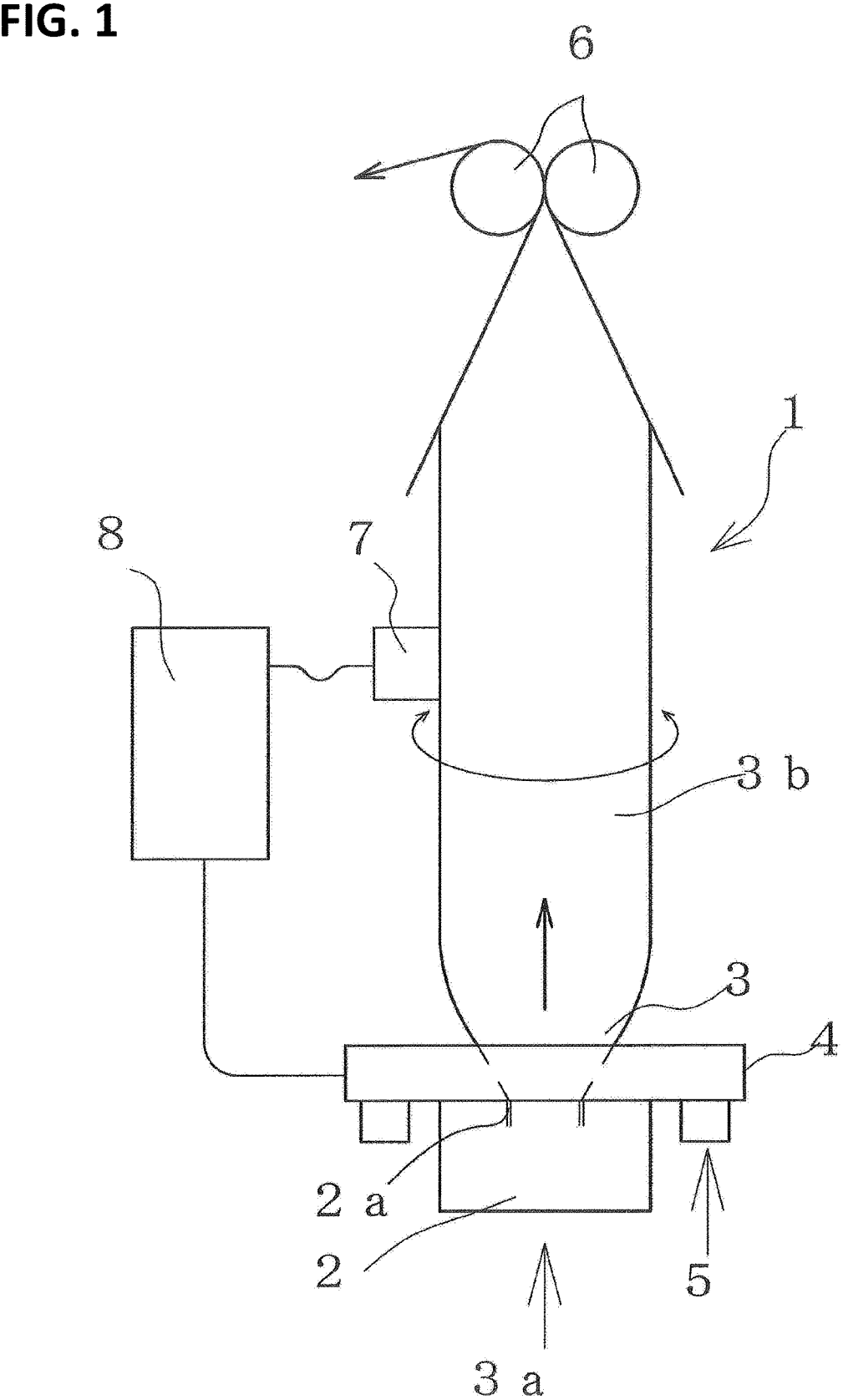
FIG. 1 is a diagram of a schematic configuration of an inflation film manufacturing apparatus illustrating a first embodiment of the present invention.
Figure 2:
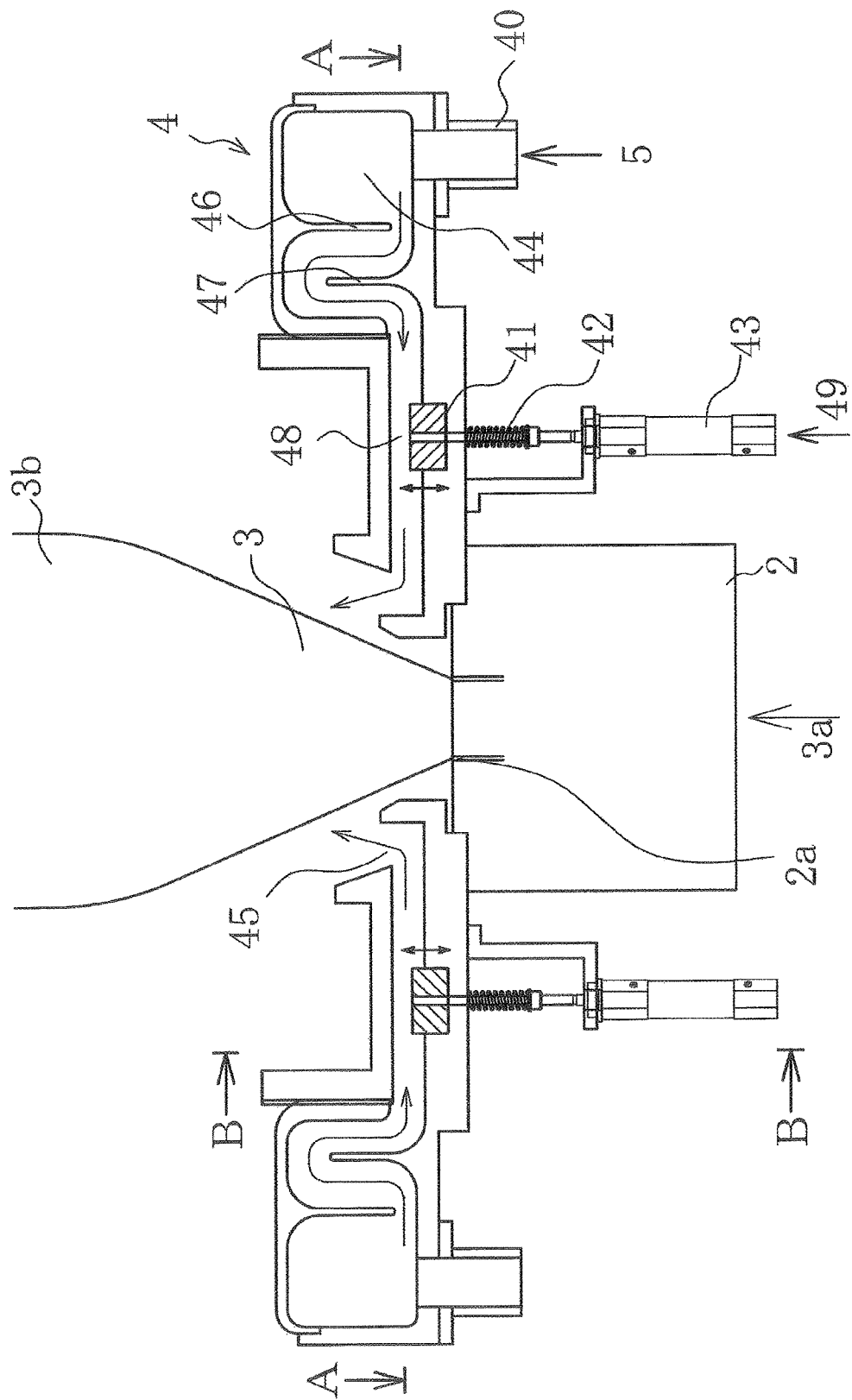
FIG. 2 is a schematic cross-sectional view of the inflation film manufacturing apparatus surrounding a thickness variation adjustment-type air ring.
Figure 3:
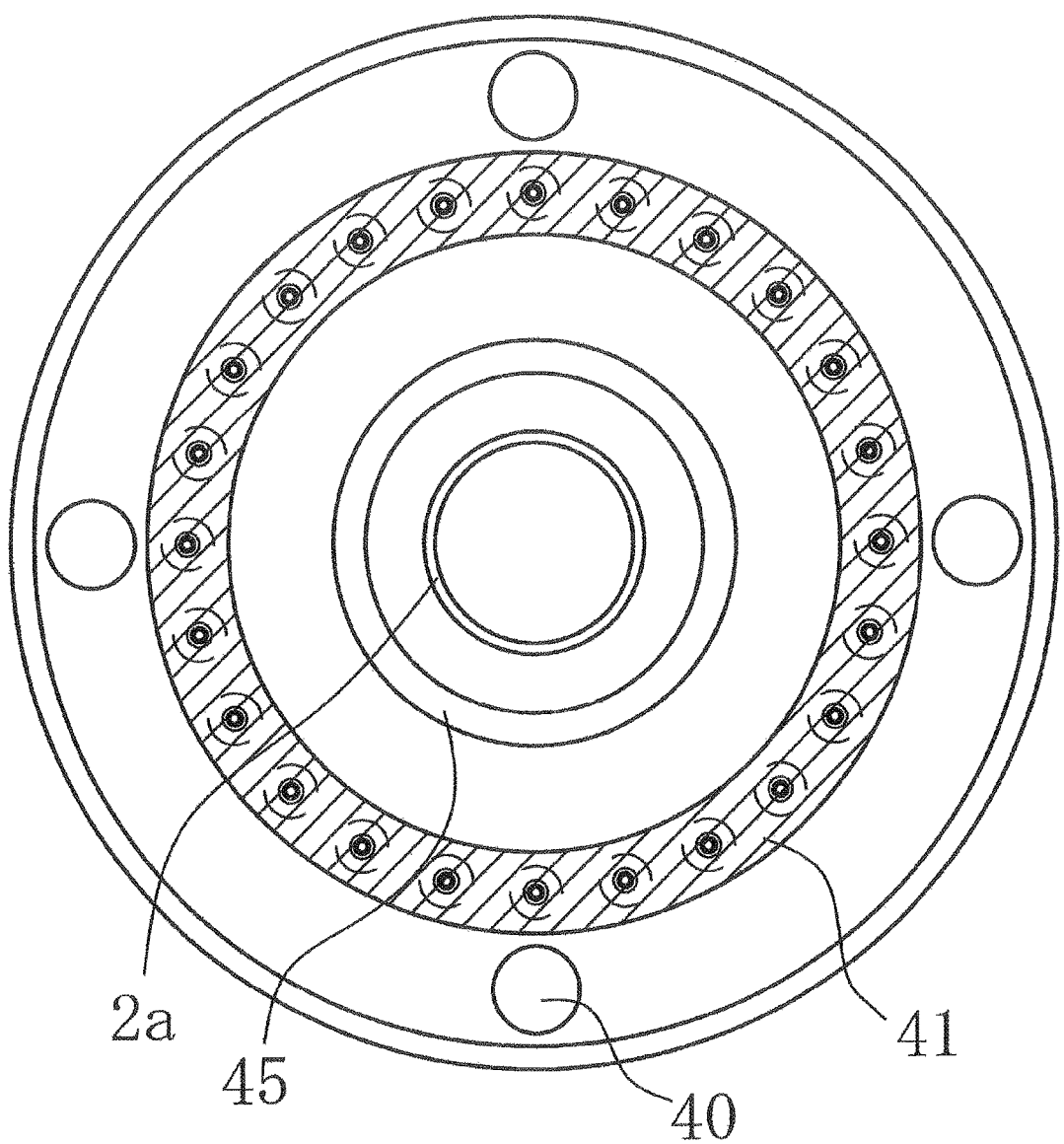
FIG. 3 is a cross-sectional view taken along arrows A-A in FIG. 2.
Figure 4:
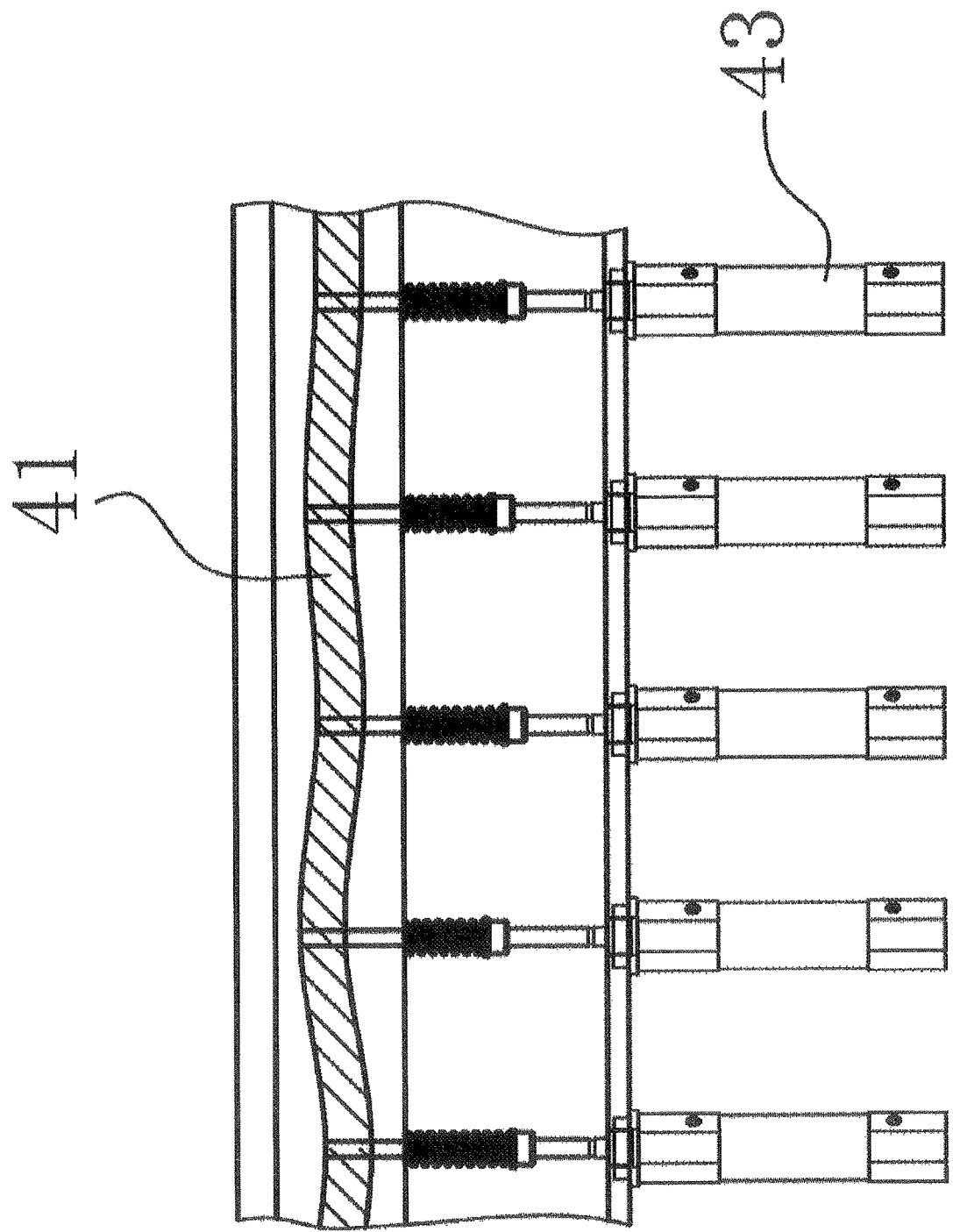
FIG. 4 is a cross-sectional view taken along arrows B-B in FIG. 2.

FIGS. 1 to 4 illustrate a first embodiment of the present invention, in which FIG. 1 is a diagram illustrating a schematic configuration of an inflation film manufacturing apparatus, FIG. 2 is a schematic cross-sectional view of the inflation film manufacturing apparatus surrounding a thickness variation adjustment-type air ring, FIG. 3 is a cross-sectional view taken along arrows A-A in FIG. 2, and FIG. 4 is a cross-sectional view taken along arrows B-B in FIG. 2.

As illustrated in FIG. 1, in an inflation film manufacturing apparatus 1, a molten synthetic resin 3a supplied to a die 2 by an extruder (not illustrated) is extruded from a die slit 2a as a molten synthetic resin tube 3. The extruded molten synthetic resin tube 3 is thinly stretched in both left and right radial directions and is cooled by cooling air 5 from a blower (not illustrated), whereby a tubular synthetic resin film 3b is obtained. The synthetic resin film 3b is drawn by a pinch roll 6 and is wound around a winding machine (not illustrated). Air having a predetermined pressure is sealed inside the molten synthetic resin tube 3 (the tubular synthetic resin film 3b).

Moreover, the inflation film manufacturing apparatus 1 includes a thickness variation adjustment-type air ring 4 which is provided on the die 2 so as to locally control the volume of the cooling air 5 discharged from a cooling air passage 48 (see FIG. 2) into the circumferential direction to adjust the thickness variation of the synthetic resin film 3b when blowing the cooling air 5 around the molten synthetic resin tube 3 extruded in the longitudinal direction to cool and solidify the molten synthetic resin tube 3 to form the synthetic resin film 3b.

Moreover, a thickness sensor 7 that measures the thickness of the tubular synthetic resin film 3b is provided on an upstream side of the pinch roll 6. The thickness sensor 7 is, for example, an electrostatic capacitance-type sensor, a laser-type sensor, or the like, in which a detection signal related to thickness variation information of the synthetic resin film 3b is input from the thickness sensor 7 into a control unit 8 which is formed as a computer or the like.

The control unit 8 modulates a ring-shaped passage adjustment portion arranged sequentially inside the cooling air passage 48 of the air ring 4 in the circumferential direction with the aid of a moving portion, based on the thickness variation information of the synthetic resin film 3b, obtained from the detection signal of the thickness sensor 7, to thereby locally control the volume of the cooling air 5 flowing through the cooling air passage 48 in the circumferential direction so that the thickness variation of the synthetic resin film 3b is decreased and equalized.

In the present embodiment, as illustrated in FIG. 2, the air ring 4 is disposed horizontally and has a ring shape such that the inner side in the radial direction of the upper surface thereof is depressed. Moreover, the air ring 4 has a ring-shaped blow out opening 45 formed in an inner circumferential portion and is fixed to the die 2 by suitable means so as to be concentric with respect to the ring-shaped die slit 2a of the die 2.

A cooling air trapping portion 44 is formed on the outer side in the radial direction inside the air ring 4 by a ring-shaped rectification plate 46. In the present embodiment, four hose openings 40 are formed in the cooling air trapping portion 44 separated at equal intervals in the circumferential direction, and the cooling air 5 from the blower (not illustrated) is introduced through hoses connected to these hose openings 40.

The cooling air passage 48 connected to the cooling air trapping portion 44 is formed on the inner side in the radial direction inside the air ring 4, and a ring-shaped elastic member 41 formed sequentially in the circumferential direction is installed in the cooling air passage 48. In the present embodiment, the elastic member 41 forms a ring-shaped passage adjustment portion arranged sequentially in the circumferential direction inside of the cooling air passage 48. As illustrated in FIGS. 3 and 4, rod portions of a plurality of air cylinders 43 arranged in line in the circumferential direction are connected to the elastic member 41. In the present embodiment, each air cylinder 43 forms a moving portion that is connected to a predetermined position in the circumferential direction of the passage adjustment portion so as to move the connecting portion of the passage adjustment portion in a predetermined direction independently from the other portions. Moreover, a coil spring 42 is attached to the rod portion of the air cylinder 43 so as to oppose the movement of the rod.

The cooling air 5 from the blower (not illustrated) is distributed to four hoses and is introduced into the cooling air trapping portion 44 on the outer side of the air ring 4 from the hose opening 40. The cooling air 5 is rectified to a uniform flow toward the center in the radial direction while winding its way up and down through the rectification plates 46 and 47 and is discharged from the blow out opening 45 toward the molten synthetic resin tube 3. In this way, the cooling air passage 48 extends in the radial direction of the molten synthetic resin tube 3, and each air cylinder 43 moves the connecting portion of the elastic member 41 in the longitudinal direction of the molten synthetic resin tube 3 (that is, in the direction running vertical to the extension direction of the cooling air passage 48). Here, a width of the cooling air passage 48 is between 3 mm and 50 mm, for example.

Since the elastic member 41 having an endless structure does not have gaps formed in between joints, etc., the cooling air 5 rectified by the rectification plates 46 and 47 and the like is not disturbed by the elastic member 41. Moreover, it is possible to locally adjust the space in which the cooling air 5 can circulate inside the cooling air passage 48 with the aid of the elastic member 41 and to reliably control the volume of the cooling air 5 at all positions in the radial direction.

Here, since the solidified portion of the molten synthetic resin tube 3 extruded from the die slit 2a is stretched and does not become thinner any more, portions which are not solidified are stretched and become thinner. Therefore, when the volume of the cooling air 5 corresponding to the thick portion in the circumferential direction of the tubular synthetic resin film 3b is decreased, the cooling and solidification of the portion of the molten synthetic resin tube 3 is delayed and thus the portion becomes thinner, rendering it possible to control the thickness variation of the synthetic resin film 3b.

When an air pressure 49 supplied to the air cylinder 43 corresponding to the thick portion of the tubular synthetic resin film 3b is increased by the control unit 8 based on the thickness variation information of the thickness sensor 7, the cooling air passage 48 narrows since the air cylinder 43 moves the elastic member 41 in a vertical direction in relation to a horizontal surface up to a position that matches the force of the coil spring 42. As a result, the volume of air supplied to the thick portion decreases, the corresponding portion of the molten synthetic resin tube 3 becomes thinner, and a uniform tubular synthetic resin film 3b whose thickness variation is low is obtained.

Since it is difficult to deform the elastic member 41 if the elastic member 41 is too hard, rubber having hardness of 70° (JIS-A) is preferred. Moreover, the elastic member 41 may be adjusted using a stepping motor or the like instead of the air cylinder 43 and may be adjusted manually by a bolt or the like.

According to the thickness variation adjustment-type air ring 4 having the above-described configuration, since it is not necessary to form a gap in the circumferential direction and it is possible to control the thickness variation locally and to control the cooling air at all positions in the circumferential direction, it is possible to form a uniform synthetic resin film 3b whose thickness variation is low.

The air ring 4 of the inflation film manufacturing apparatus 1 of the first embodiment was manufactured and tested.

When a five-hour long continuous operation was performed under manufacturing conditions such that LLDPE having the MRF of 1 was used as the raw material for the molten synthetic resin 3a, a tube having a 1000 mm diameter and a tube whose thickness was 50 μm were used, and where the drawing speed was 23 m/minute, a synthetic resin film 3b whose thickness variation was between ±5.7% and ±6.4% (the thickness unevenness was based on average thickness) was obtained.

Figure 5:
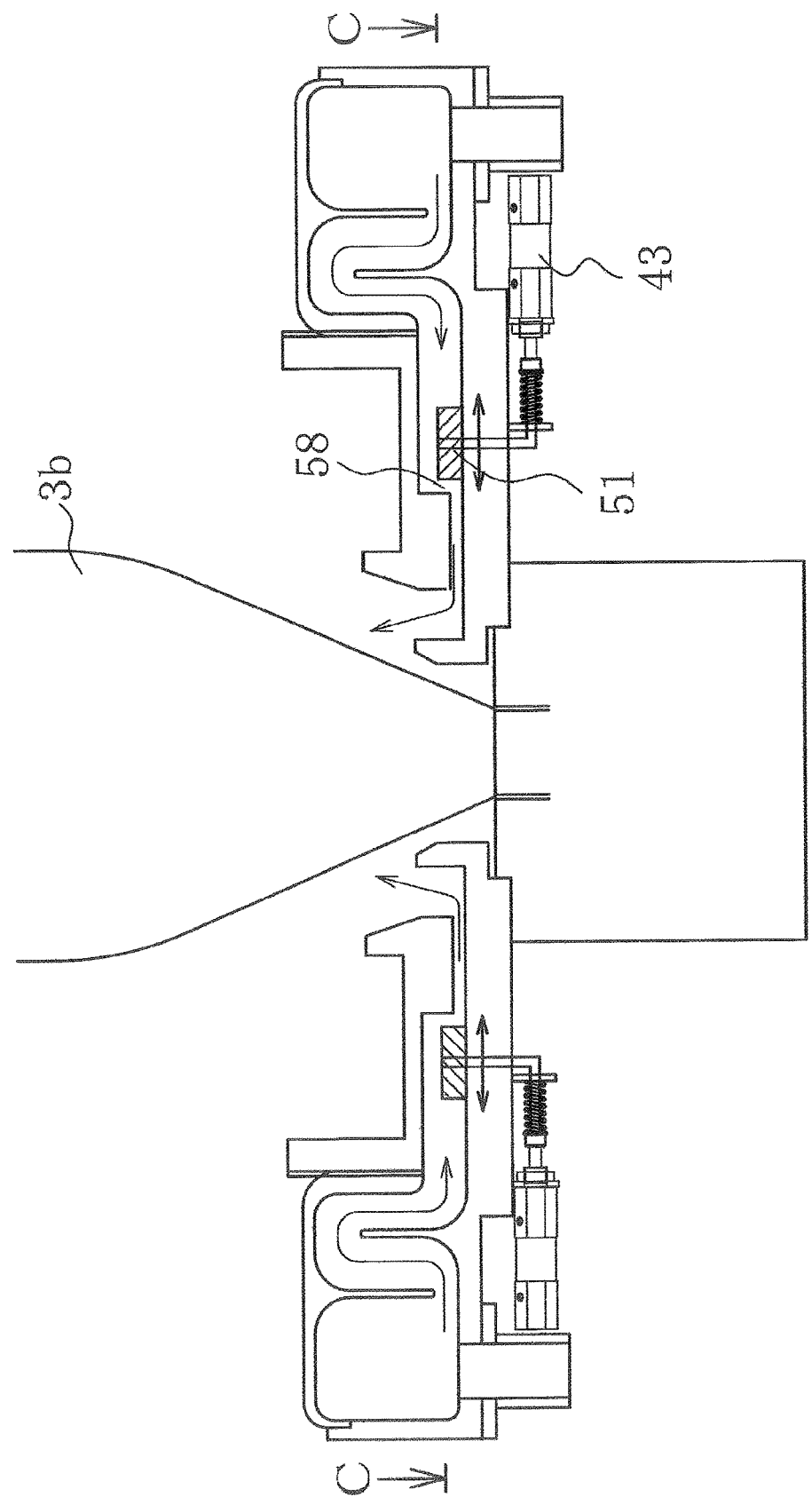
FIG. 5 is a schematic cross-sectional view of an inflation film manufacturing apparatus surrounding a thickness variation adjustment-type air ring illustrating a second embodiment of the present invention.
Figure 6:
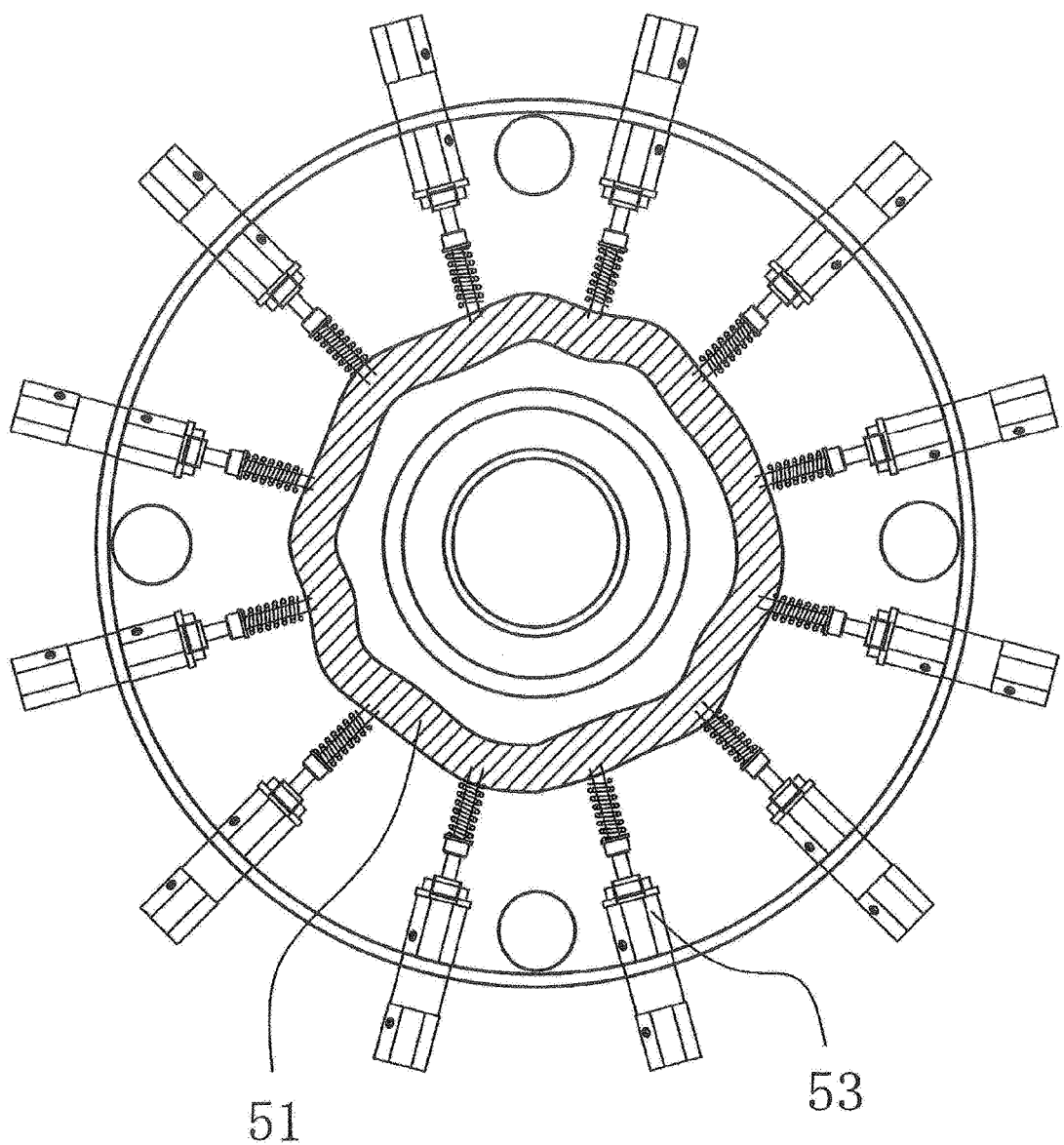
FIG. 6 is a cross-sectional view taken along arrows C-C in FIG. 5.

FIGS. 5 and 6 illustrate a second embodiment of the present invention, in which FIG. 5 is a schematic cross-sectional view of an inflation film manufacturing apparatus and FIG. 6 is a cross-sectional view taken along arrows C-C in FIG. 5.

In the first embodiment, although the elastic member 41 is moved in the longitudinal direction of the molten synthetic resin tube 3, the moving direction of the passage adjustment portion may be set arbitrarily. In the second embodiment, as illustrated in FIGS. 5 and 6, the air cylinder 43 moves the connecting portion of the elastic member 51 in the radial direction of the molten synthetic resin tube 3 to locally adjust the gap of the cooling air passage 58 as well as to locally adjust the volume of cooling air, thereby controlling the thickness variation of the synthetic resin film 3b.

Figure 7:
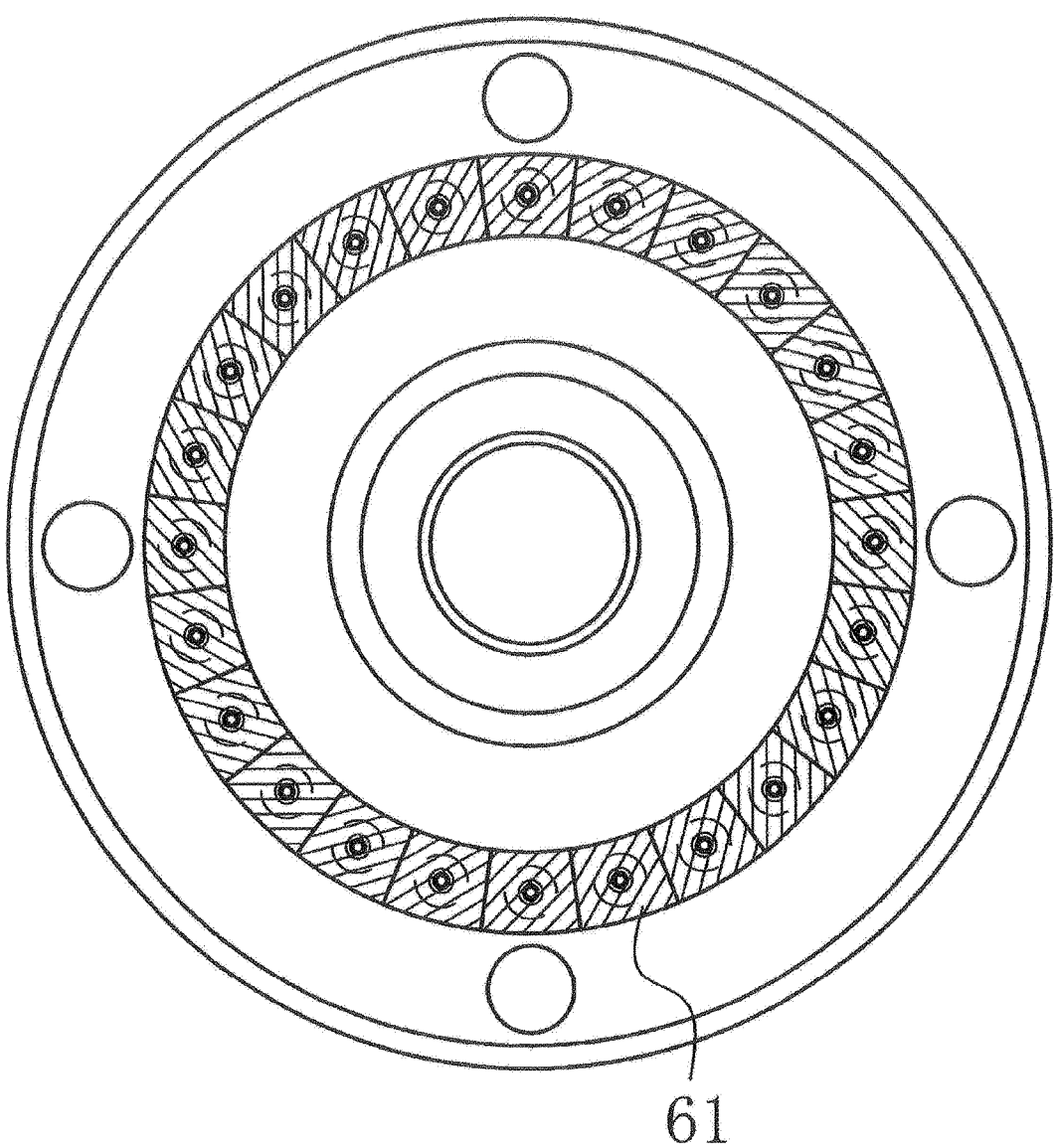
FIG. 7 is a planar cross-sectional view of a thickness variation adjustment-type air ring illustrating a third embodiment of the present invention.
Figure 8:
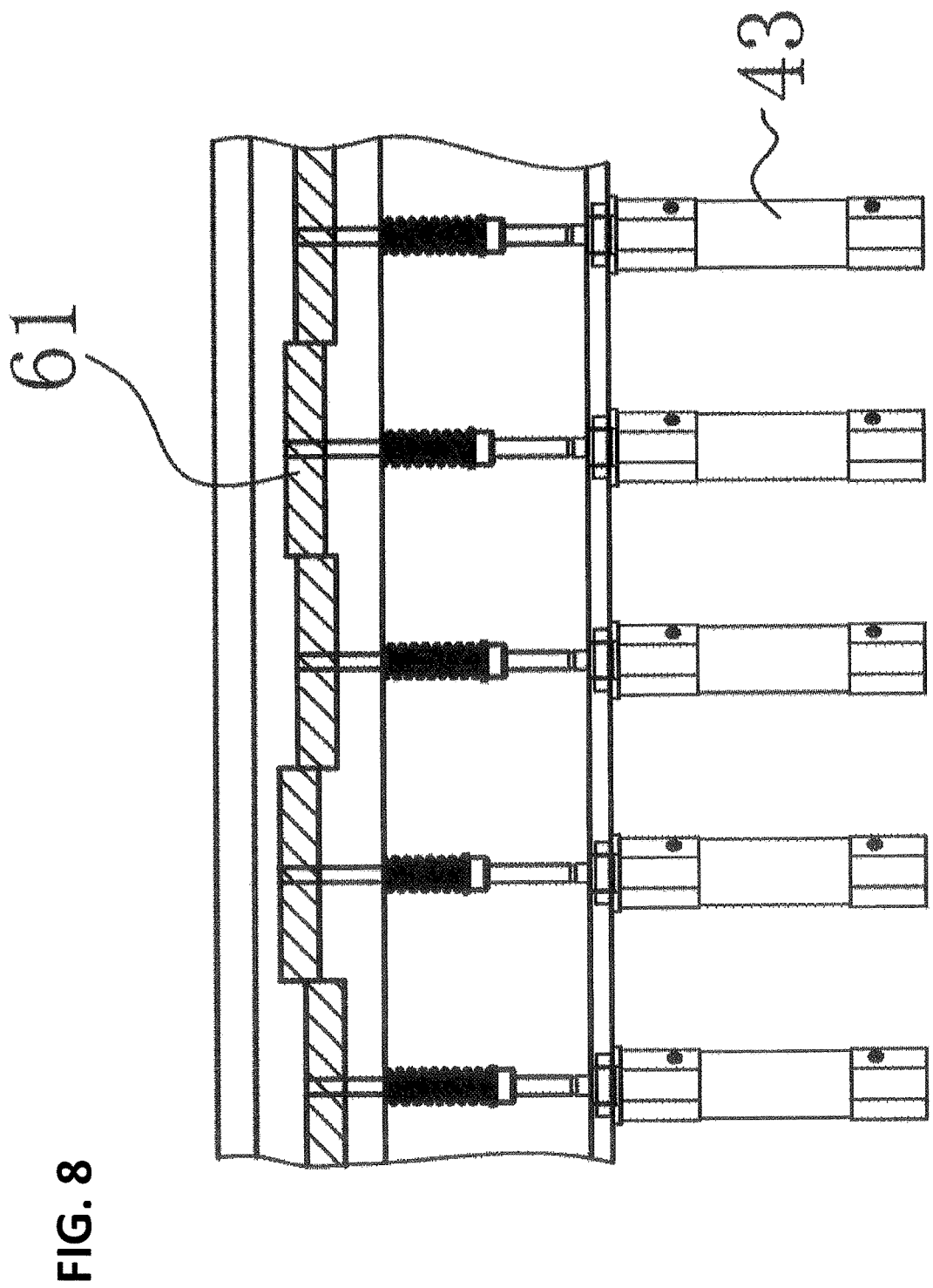
FIG. 8 is a side cross-sectional view of a thickness variation adjustment-type air ring.
Figure 9:
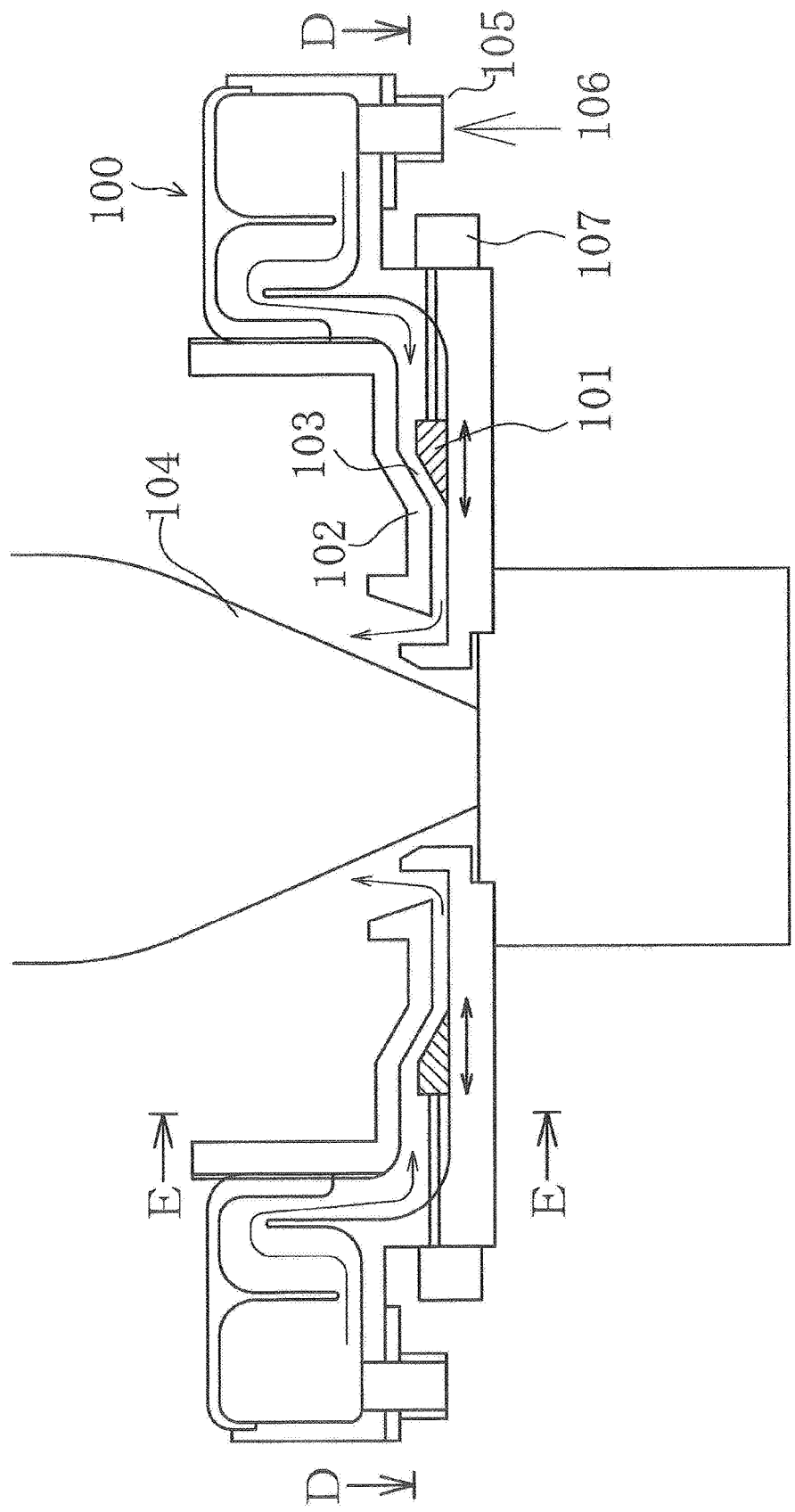
FIG. 9 is a planar cross-sectional view of a conventional thickness variation adjustment-type air ring.
Figure 10:
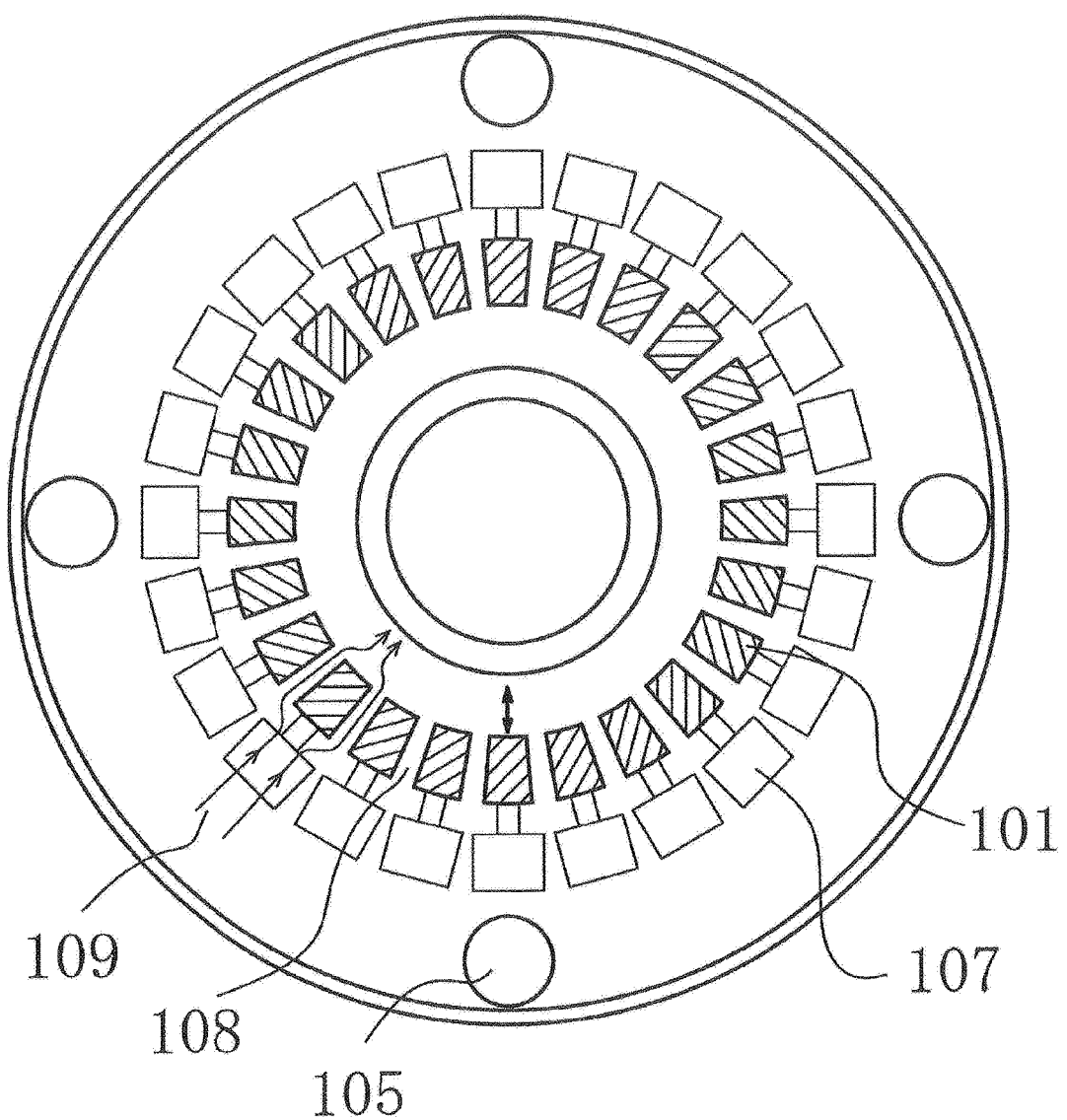
FIG. 10 is a cross-sectional view taken along arrows D-D in FIG. 9.
Figure 11:
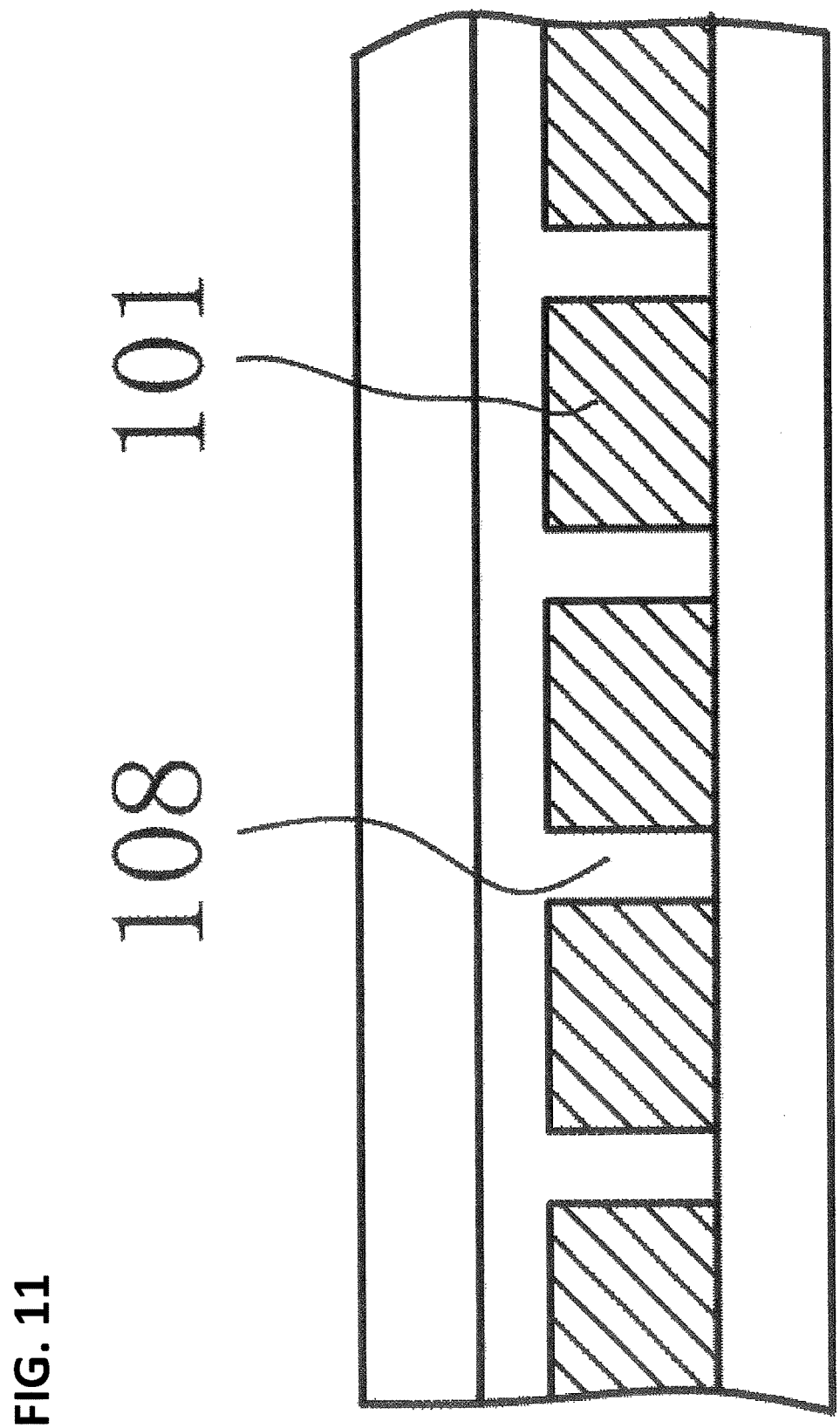
FIG. 11 is a cross-sectional view taken along arrows E-E in FIG. 9.

FIGS. 7 and 8 illustrate a third embodiment of the present invention, in which FIG. 7 is a planar cross-sectional view of a thickness variation adjustment-type air ring and FIG. 8 is a side cross-sectional view of the thickness variation adjustment-type air ring.

In the present embodiment, the passage adjustment portion is formed as a plurality of movable members 61 which are arranged in a ring form without any gap in the circumferential direction and can move in the longitudinal direction of the molten synthetic resin tube 3. Since the movable members 61 can move the air cylinder 43 in a vertical direction in relation to a horizontal surface and no gap is formed between the movable members 61, the flow of the cooling air 5 is not disturbed, and it is possible to locally control the cooling air 5 as intended at all positions.

While embodiments of the present invention have been described, the embodiments described above do not limit the invention described in the claims. Moreover, it is to be noted that not all combinations of the features described in the embodiment are necessarily indispensable for solving the problems intended to be solved by this invention.

INDUSTRIAL APPLICABILITY

The thickness variation adjustment-type air ring of the present invention can accurately and optimally control the volume of cooling air at all positions in the circumferential direction and stably manufacture a synthetic resin film having an exceptionally low thickness variation.

EXPLANATION OF REFERENCE NUMERALS

1: Inflation film manufacturing apparatus
2: Die
2a: Die slit
3: Molten synthetic resin tube
3a: Molten synthetic resin
3b: Synthetic resin film
4: Air ring
5: Cooling air
7: Thickness sensor
8: Control unit 40: Hose opening
41: Elastic member
42: Coil spring
43: Air cylinder
45: Blow out opening
46: Rectification plate
47: Rectification plate
48: Cooling air passage
51: Elastic member
58: Cooling air passage
61: Movable member
100: Air ring
101: Slope member
102: Blow out ring
103: Passage
104: Molten synthetic resin tube
105: Hose opening
106: Cooling air
107: Moving portion
108: Gap

The invention claimed is:

1. A thickness variation adjustment-type air ring which is provided on a die of an inflation film manufacturing apparatus which locally controls a volume of cooling air discharged from a cooling air passage in a circumferential direction to adjust a thickness variation of a synthetic resin film when blowing the cooling air around a molten synthetic resin tube extruded in a longitudinal direction to cool and to solidify the molten synthetic resin tube to form the synthetic resin film, the thickness variation adjustment-type air ring comprising:
a ring-shaped passage adjustment portion arranged sequentially in the circumferential direction inside of the cooling air passage; and
a plurality of moving portions connected at a predetermined position in the circumferential direction of the passage adjustment portion so as to move a connecting portion of the passage adjustment portion in a predetermined direction independently from other portions,
wherein the cooling air passage is substantially closed and not divided,
wherein the passage adjustment portion includes a ring-shaped elastic member formed sequentially in the circumferential direction,
wherein the cooling air passage includes a groove in which the ring-shaped elastic member is placed,
wherein a moving portion of the moving portions moves a connecting portion of the elastic member in the longitudinal direction of the molten synthetic resin tube, and
wherein a space in which the cooling air is configured to circulate inside the cooling air passage is locally adjusted in the circumferential direction and the volume of cooling air is locally controlled in the circumferential direction.

2. The thickness variation adjustment-type air ring according to claim 1, wherein the moving portion includes an air cylinder.

3. The thickness variation adjustment-type air ring according to claim 2, wherein the moving portion further includes a rod portion which moves in the longitudinal direction of the molten synthetic resin tube, and
wherein the elastic member is attached to the rod portion.

4. The thickness variation adjustment-type air ring according to claim 3, wherein the moving portion further includes a coil spring applying a force to the rod portion.

5. The thickness variation adjustment-type air ring according to claim 1, wherein the elastic member is attached to a rod portion of the moving portion which moves in the longitudinal direction of the molten synthetic resin tube.

6. The thickness variation adjustment-type air ring according to claim 1, wherein the moving portion includes:
a rod portion which moves in the longitudinal direction of the molten synthetic resin tube; and
a coil spring applying a force to the rod portion.

7. The thickness variation adjustment-type air ring according to claim 1, wherein the ring-shaped elastic member has an endless structure.

8. The thickness variation adjustment-type air ring according to claim 1, wherein the ring-shaped elastic member is free of gaps in between joints.

* * * * *